(12) United States Patent
Crawley

(10) Patent No.: US 7,860,460 B2
(45) Date of Patent: Dec. 28, 2010

(54) WIRELESS SIGNAL LOSS DETECTION

(75) Inventor: Casimir Johan Crawley, Carmel, IN (US)

(73) Assignee: Thomson Licensing, Boulogne-Billencourt (FR)

( * ) Notice: Subject to any disclaimer, the term of this patent is extended or adjusted under 35 U.S.C. 154(b) by 285 days.

(21) Appl. No.: 10/516,859

(22) PCT Filed: Jun. 3, 2003

(86) PCT No.: PCT/US03/17369

§ 371 (c)(1),
(2), (4) Date: Dec. 3, 2004

(87) PCT Pub. No.: WO03/103171

PCT Pub. Date: Dec. 11, 2003

(65) Prior Publication Data

US 2005/0152477 A1    Jul. 14, 2005

Related U.S. Application Data

(60) Provisional application No. 60/385,485, filed on Jun. 4, 2002.

(51) Int. Cl.
*H04B 7/00* (2006.01)

(52) U.S. Cl. .................. 455/41.3; 455/63.1; 455/67.16; 455/229; 455/260; 455/265; 455/312

(58) Field of Classification Search .................. 700/94; 455/66.1, 344, 41.2–3, 41.3, 63.1, 67.11, 455/67.16, 231, 229, 260, 265, 309, 312; 381/2–4, 14, 16

See application file for complete search history.

(56) References Cited

U.S. PATENT DOCUMENTS

| 4,544,964 | A | * | 10/1985 | Burns et al. .................... 360/51 |
| 4,891,824 | A | * | 1/1990 | Takamura et al. ........... 375/351 |
| 4,940,951 | A | * | 7/1990 | Sakamoto ...................... 331/4 |
| 5,003,557 | A | * | 3/1991 | Fujiyama ..................... 375/357 |

(Continued)

FOREIGN PATENT DOCUMENTS

JP          04271634          9/1992

(Continued)

OTHER PUBLICATIONS

Search Report Dated Aug. 8, 2003.

(Continued)

*Primary Examiner*—Edward Urban
*Assistant Examiner*—RuiMeng Hu
(74) *Attorney, Agent, or Firm*—Robert D. Shedd; Robert B. Levy; Jeffrey D. Hale

(57) ABSTRACT

An apparatus included a receiver for receiving an audio file signal, a decoder for demodulating the audio file signal; and a processor for polling the decoder for a loss of a phase lock in the demodulating of the audio file signal. The processor resets and reinitializes the decoder in response to the loss in the phase lock loop. The receiver includes 90 MHz radio frequency reception circuit. The decoder comprises an eight-to-four modulation EFM decoder. In the preferred embodiment, the decoder outputs a digital audio stream that conforms to a known I2S audio stream format.

17 Claims, 2 Drawing Sheets

U.S. PATENT DOCUMENTS

| | | | | |
|---|---|---|---|---|
| 5,432,521 | A * | 7/1995 | Siwiak et al. | 342/352 |
| 5,440,586 | A * | 8/1995 | Den Braber | 375/327 |
| 5,491,839 | A * | 2/1996 | Schotz | 455/39 |
| 5,714,932 | A * | 2/1998 | Castellon et al. | 340/539.11 |
| 5,748,046 | A | 5/1998 | Badger | |
| 5,822,440 | A * | 10/1998 | Oltman et al. | 381/82 |
| 5,832,024 | A * | 11/1998 | Schotz et al. | 375/134 |
| 5,850,415 | A | 12/1998 | Hunsinger et al. | |
| 5,878,336 | A | 3/1999 | Cashen et al. | |
| 5,946,343 | A * | 8/1999 | Schotz et al. | 375/141 |
| 5,950,115 | A | 9/1999 | Momtaz et al. | |
| 6,075,829 | A * | 6/2000 | Hayashi et al. | 375/344 |
| 6,182,128 | B1 | 1/2001 | Kelkar et al. | |
| 6,389,548 | B1 * | 5/2002 | Bowles | 713/500 |
| 6,421,544 | B1 * | 7/2002 | Sawada | 455/565 |
| 6,466,832 | B1 * | 10/2002 | Zuqert et al. | 700/94 |
| 6,496,692 | B1 | 12/2002 | Shanahan | |
| 6,510,182 | B1 * | 1/2003 | Lee et al. | 375/259 |
| 6,772,021 | B1 * | 8/2004 | Fuller | 700/94 |
| 7,031,476 | B1 * | 4/2006 | Chrisop et al. | 381/77 |
| 7,050,809 | B2 * | 5/2006 | Lim | 455/445 |
| 2001/0033531 | A1 * | 10/2001 | Ozawa et al. | 369/47.12 |
| 2002/0002035 | A1 * | 1/2002 | Sim et al. | 455/41 |
| 2002/0085713 | A1 | 7/2002 | Feig et al. | |
| 2002/0159434 | A1 * | 10/2002 | Gosior et al. | 370/350 |
| 2002/0183025 | A1 * | 12/2002 | Seaberg et al. | 455/132 |
| 2003/0053548 | A1 * | 3/2003 | Lee et al. | 375/259 |
| 2003/0158614 | A1 * | 8/2003 | Friel et al. | 700/94 |
| 2003/0163823 | A1 * | 8/2003 | Logan et al. | 725/89 |
| 2003/0181182 | A1 * | 9/2003 | Hoi | 455/258 |
| 2003/0185330 | A1 * | 10/2003 | Hessel et al. | 375/376 |
| 2004/0214525 | A1 * | 10/2004 | Ahn et al. | 455/41.2 |
| 2005/0272381 | A1 * | 12/2005 | Crawley | 455/73 |
| 2007/0195913 | A1 * | 8/2007 | Hessel et al. | 375/341 |

FOREIGN PATENT DOCUMENTS

| | | |
|---|---|---|
| JP | 09083959 | 3/1997 |
| JP | 2000-101555 | 4/2000 |

OTHER PUBLICATIONS

Finotello A et al: "The VHDL based design of the MIDA MPEG1 audio decoder" Design Automatic Conference, 1995, IEEE Comput. Soc. US, Sep. 18, 1995, pp. 579-584, XP010192972, ISBN: 978-0-8186-7156-2.

European Search Report dated Dec. 28, 2009.

* cited by examiner

WIRELESS SIGNAL LOSS DETECTION

This application claims the benefit, under 35 U.S.C. §365 of International Application PCT/US03/17369, filed Jun. 3, 2003, which was published in accordance with PCT Article 21(2) on Dec. 11, 2003 in English and which claims the benefit of U.S. provisional patent application No. 60/385,485, filed Jun. 4, 2002.

FIELD OF THE INVENTION

The present invention relates generally to wireless communications, and more particularly to wireless signal loss detection.

DESCRIPTION OF THE RELATED ART

Many consumers want to enjoy a vast collection of digital audio files stored on their PC by playing those audio files on an audio system. Users have already been transferring audio files from CD storage onto their personal computers. Playing audio files directly from an Internet web site through a personal computer to a home audio system permits using the computer's processing and storage capacities to increase play lists, as well as organize a library of digital music files using ID3 tag song data to display artist, album, song title and genre. Wireless transmission and reception between a personal computer and the audio system would permit a higher quality listening experience for a user Wireless transmitter and receiver techniques must be able to send CD-quality digital audio from the personal computer to the audio system. Active users of jukebox-managed personal computer content and Internet audio listeners seeking alternatives for listening to digital quality music files require a convenient connection between their personal computer and audio system. Continuous transmission and reception between the audio file source and the audio system is required for full user experience in listening to digital quality music files available from a personal computer or a network site.

Wireless transmission techniques applied to audio files transmitted to a wireless receiver can cease its decoding after long periods of transmission idleness from the audio file transmitter source. A phase lock loop in the decoding by the receiver can unlock. Loss of the phase lock loop by the receiver would require the user to manually re-establish a phase lock loop in the decoding of audio file transmissions from the transmitter. Accordingly there is a need for detecting signal loss between the receiver and the signal transmitter and automatically resetting a signal phase lock to maintain near seamless playing of audio files received over a wireless communications link.

SUMMARY OF THE INVENTION

The present apparatus includes a receiver for receiving an audio file signal, a decoder for demodulating the audio file signal, and a processor for polling the decoder for a loss of a phase lock in the demodulating of the audio file signal. The processor resets and reinitializes the decoder in response to the loss in the phase lock loop. The receiver includes 900 MHz radio frequency reception circuitry. The decoder comprises an eight-to-fourteen modulation EFM decoder. In a preferred embodiment, the decoder outputs a digital audio stream that conforms to a known I2S audio stream format.

The present computer readable medium contains software instructions that, when executed by a processor, perform the steps of receiving a modulated audio file signal, demodulating the modulated audio file signal, polling the demodulating for a loss in a phase lock in the demodulating, and resetting and reinitializing the demodulating in reply to the loss in the phase lock. The demodulating is preferably a demodulation of an eight-to-fourteen EFM bit digital encoding synchronized to a 900 MHz range carrier frequency modulated by the digital encoding A method for detecting a signal loss in a wireless audio file signal transmission includes the steps of receiving an audio file signal, decoding the audio file signal, and polling the decoder for a loss of a phase lock in the decoding of the audio file signal. In response to the loss in the phase lock in the decoding the decoder is reset and reinitialized. The step of receiving, preferably, is synchronized to a 900 MHz range carrier frequency modulated by the audio file signal. The step of decoding includes an eight-to-fourteen bit modulation EFM decoding.

BRIEF DESCRIPTION OF THE DRAWINGS

A more complete understanding of the present invention may be obtained from consideration of the following description in conjunction with the drawings, in which.

To facilitate understanding, identical reference numerals have been used, where possible, to designate identical elements that are common to the figures.

DETAILED DESCRIPTION

Figure 1:
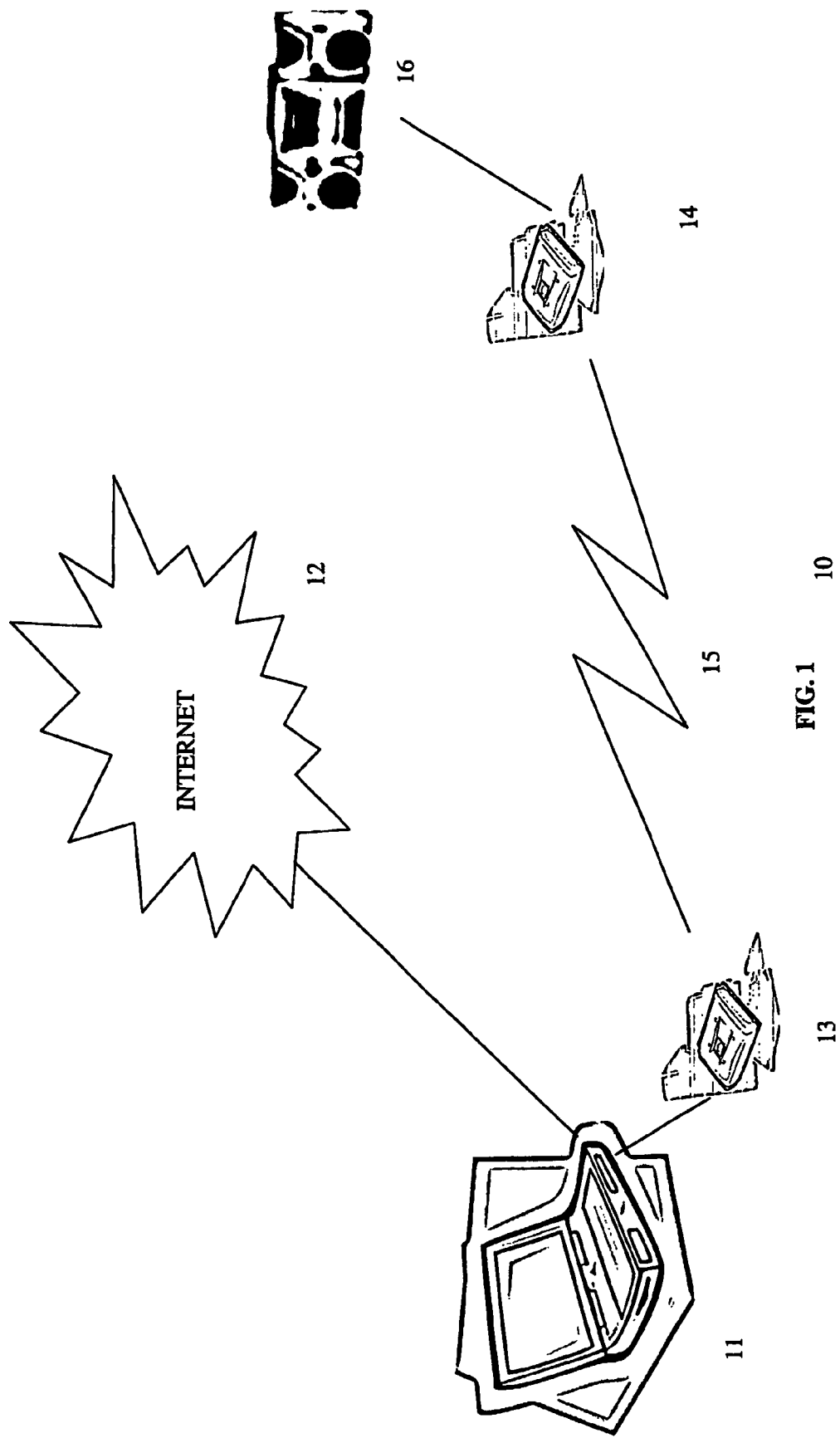
FIG. 1 depicts an exemplary communications environment including an Internet network, a computer, a wireless transmitter, a wireless receiver, and an audio system.

FIG. 1 depicts an exemplary communications environment 10 including an exemplary network 12, such as the Internet, a personal computer 11 with wireless transmitter 13, and a wireless receiver 14. The wireless transmitter 13 transfers audio files on the computer 11 to the wireless receiver 14 over wireless medium 15. The wireless receiver then sends the analog stereo signal to the audio system 16. The audio files can be any one of various file types, such as mp3, files stored for retention during shutoff of the computer or stored temporarily when the computer serves as a conduit for transmission of audio files from across the network to the wireless receiver 14. The transmitter 13 can be an integral component of the computer's architecture or an add-on device communicating with the computer through a port connection, such as a universal serial bus connection USB. The exemplary computer 11, shown as a laptop computer, can be a desktop computer system or a processor based device capable of relaying transfer of audio files from across a network to the wireless receiver 14.

Figure 2:
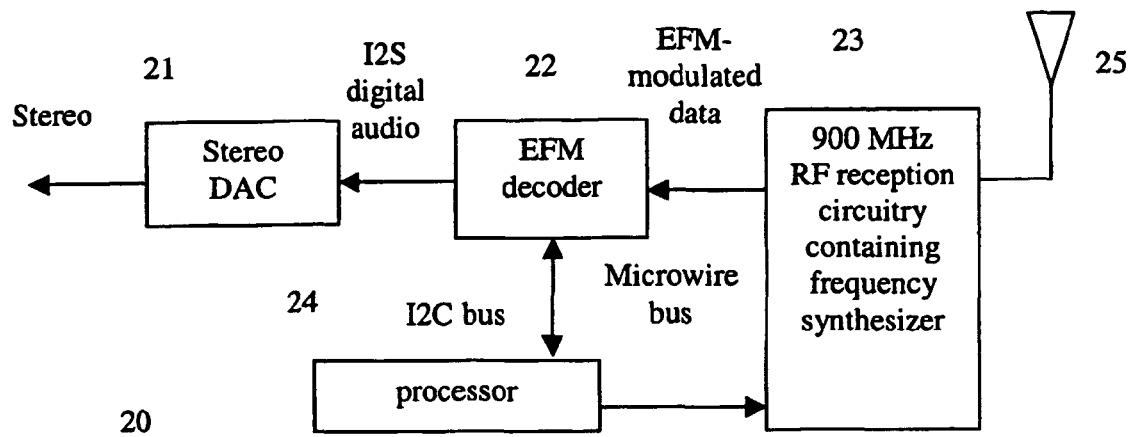
FIG. 2 is a block diagram of an exemplary wireless receiver for implementing the invention.

FIG. 2 is a block diagram of an exemplary wireless receiver. An incoming modulated or encoded analog signal received at an antenna 25 is received into the reception circuitry board 23 containing a frequency synthesizer for synchronizing the receiver to an exemplary transmitter carrier frequency in the range of 900 MHz. The encoded signal is decoded by an eight-to-fourteen modulation decoder 22. Eight-to-fourteen EFM encoding is a known encoding technique for compact disk CD encoding. A digital audio stream I2S from the decoder 22 is changed by the stereo digital-to-analog converter DAC 21 into an analog stereo input signal to an audio system. Communications protocols between the decoder 22 and processor 24 preferably conform to known I2C bus protocols. The processor is preferably a microprocessor tied over a microwire bus to the reception circuitry 23. The processor controls the frequency synthesizer for synchronizing the receiver to the radio carrier frequency of the audio file signal source transmitter. The microprocessor continually queries the EFM decoder and determines whether the decoder's EFM PLL is locked or unlocked. If the EFM PLL is unlocked, then the microprocessor will perform an EFM decoder soft reset and re-initialization. The processor 24 else-carries out the inventive wireless audio file signal loss detection and resetting and initialization of the decoder 22 when a loss of the wireless audio file signal is detected.

Figure 3:
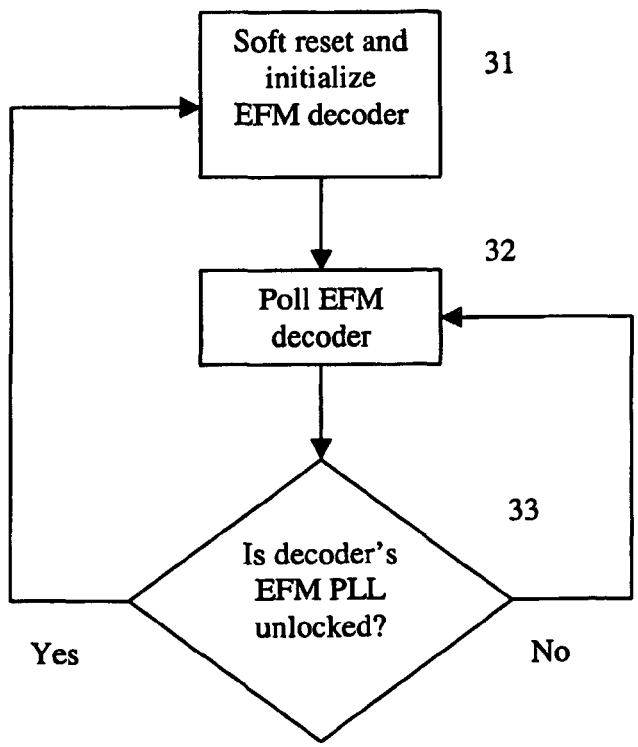
FIG. 3 depicts a wireless phase locked loop unlocked condition and recovery flow chart suitable for use in the receiver of FIG. 2.

FIG. 3 is a flow chart for detecting a wireless phase lock loop PLL unlocked condition and recovery flow chart for use in the receiver of FIG. 2. The processor 24 continually polls the decoder 32 to determine if a phase lock loop in the demodulation of the incoming audio file signal has been lost 33. If the decoder's phase lock loop PLL has unlocked the processor undertakes a software reset of the decoder and reinitializes a phase lock loop condition in the decoding of the audio file signal received at the antenna 25. If the decoder's phase lock loop PLL remains locked, the processor 24 continues to poll the decoder for an unlocked condition in the phase lock loop. The automatic EFM PLL unlocked condition detection and recovery allows for no user awareness or intervention requirement.

Although various embodiments which incorporate the teachings of the present invention have been shown and described in detail herein, those skilled in the art can readily devise many other varied embodiments that will still incorporate these teachings. The present invention has been described within the context of an audio system receiving transmission of audio files from a personal computer. It will be appreciated by those skilled in the art that the teachings of the present invention directed to wireless signal loss detection recovery may be practiced where the wireless signal is transmitting audio files stored on the computer or audio files downloaded from across the network onto the computer for streaming transfer to the audio system. The audio system can be equipped with an analog stereo input jack, e.g. a home stereo with a "LINE" or "AUX" jack, for receiving the stereo audio signal.

The invention claimed is:

1. Apparatus comprising:
a receiver for receiving an audio file signal;
a decoder for demodulating said audio file signal; and
a processor configured to poll said decoder for a loss of a phase lock loop in said demodulating of said audio file signal to detect audio file signal loss between the receiver and a transmitter, wherein the processor is further configured to, in response to said loss in said phase lock loop, automatically and repeatedly reset and reinitialize said decoder throughout a period of signal transmission idleness at a transmitter source until a transmission signal is received and a phase lock loop is established.

2. The apparatus of claim 1, wherein said processor resets and reinitializes said decoder in response to said loss in said phase lock loop such that seamless playing of audio files is maintained.

3. The apparatus of claim 1, wherein said receiver comprises 900 MHz radio frequency reception circuitry.

4. The apparatus of claim 1, wherein said decoder comprises an eight-to-fourteen modulation EFM decoder.

5. The apparatus of claim 1, wherein said decoder outputs a digital audio stream.

6. The apparatus of claim 5, wherein said digital audio stream conforms to an I2S audio stream.

7. A non-transitory computer readable medium having software instructions recorded thereon, wherein the software instructions, when executed by a processor, perform the steps of: receiving a modulated audio file signal; demodulating said modulated audio file signal; polling said demodulating for a loss in a phase lock loop in said demodulating to detect audio file signal loss between a receiver and a transmitter; and in response to said loss in said phase lock loop, automatically and repeatedly resetting and reinitializing said demodulating throughout a period of signal transmission idleness at a transmitter source until a transmission signal is received and a phase lock loop is established such that seamless playing of audio files is maintained.

8. The computer readable medium according to claim 7, wherein said demodulating is a digital eight-to-fourteen modulation digital decoding.

9. The computer readable medium according to claim 7, wherein said receiving is synchronized to a 900 MHz range carrier frequency modulated by said audio file signal.

10. The computer readable medium according to claim 7, wherein said demodulating outputs a digital audio stream.

11. The computer readable medium according to claim 7, wherein said polling is carried out by a processor.

12. A method for detecting a signal loss in a wireless audio file signal transmission, said method comprising the steps of:
receiving an audio file signal;
decoding said audio file signal;
polling said decoding for a loss of a phase lock loop in said decoding of said audio file signal to detect audio file signal loss between a receiver and a transmitter; and
in response to said loss in said phase lock loop, automatically and repeatedly resetting and reinitializing said decoding throughout a period of signal transmission idleness at a transmitter source until a transmission signal is received and a phase lock loop is established.

13. The method of claim 12, further comprising the step of resetting and reinitializing said decoding in response to said loss in said phase lock loop in said decoding such that seamless playing of audio files is maintained.

14. The method of claim 12, wherein said step of receiving comprises 900 MHz range carrier frequency synchronizing.

15. The method of claim 12, wherein said step of decoding comprises an eight-to-fourteen bit modulation EFM decoding.

16. The method of claim 12, wherein said step of decoding outputs a digital audio stream.

17. The method of claim 16, wherein said digital audio stream conforms to an I2S audio stream.

* * * * *